United States Patent
Bohnacker et al.

(10) Patent No.: US 10,696,524 B2
(45) Date of Patent: Jun. 30, 2020

(54) PROCESS FOR THE ASSISTED PERFORMANCE OF CRANE MOVEMENTS BY A CRANE, AS WELL AS A CRANE

(71) Applicant: Liebherr-Werk Ehingen GmbH, Ehingen (DE)

(72) Inventors: Roland Bohnacker, Blaubeuren (DE); Max Kenzelmann, Schelklingen (DE)

(73) Assignee: Liebherr-Werk Ehingen GmbH, Ehingen (DE)

(*) Notice: Subject to any disclaimer, the term of this patent is extended or adjusted under 35 U.S.C. 154(b) by 0 days.

(21) Appl. No.: 15/850,926

(22) Filed: Dec. 21, 2017

(65) Prior Publication Data

US 2018/0179027 A1 Jun. 28, 2018

(30) Foreign Application Priority Data

Dec. 22, 2016 (DE) .................. 10 2016 015 388

(51) Int. Cl.
| | | |
|---|---|---|
| B66C 13/46 | (2006.01) | |
| B66C 13/20 | (2006.01) | |
| B66C 23/76 | (2006.01) | |
| B66C 13/06 | (2006.01) | |
| B66C 13/48 | (2006.01) | |
| B66C 23/82 | (2006.01) | |

(52) U.S. Cl.
CPC .......... *B66C 13/46* (2013.01); *B66C 13/06* (2013.01); *B66C 13/20* (2013.01); *B66C 13/48* (2013.01); *B66C 23/76* (2013.01); *B66C 23/82* (2013.01); *G05B 2219/39483* (2013.01)

(58) Field of Classification Search
CPC ................ B66C 13/46; G05B 2219/39483
See application file for complete search history.

(56) References Cited

U.S. PATENT DOCUMENTS

| | | | | |
|---|---|---|---|---|
| 6,065,619 A | * | 5/2000 | Miyata | B66C 13/48 |
| | | | | 212/270 |
| 9,783,395 B2 | * | 10/2017 | Albinger | B66C 13/16 |
| 2010/0280668 A1 | * | 11/2010 | Puura | B25J 9/1653 |
| | | | | 700/282 |
| 2014/0333232 A1 | * | 11/2014 | Verheyen | B66C 13/38 |
| | | | | 318/5 |
| 2015/0249821 A1 | * | 9/2015 | Tanizumi | B60R 1/00 |
| | | | | 348/46 |
| 2019/0084809 A1 | * | 3/2019 | Claeys | B66C 23/90 |

FOREIGN PATENT DOCUMENTS

| | | |
|---|---|---|
| DE | 102006040782 A1 | 3/2008 |
| DE | 102009032267 A1 | 1/2011 |
| DE | 102010063911 A1 | 6/2012 |
| DE | 102015217742 A1 | 3/2017 |
| EP | 1491486 B1 | 10/2008 |
| EP | 2377653 A1 | 10/2011 |

* cited by examiner

*Primary Examiner* — Alex C Dunn
(74) *Attorney, Agent, or Firm* — Dilworth & Barrese, LLP

(57) ABSTRACT

The present invention relates to a process for the assisted performance of crane movements by a crane with at least two boom elements that are movable relative to one another, whereby an auxiliary control module, after activation by the user, determines at least one target position of the boom system, determines the crane movements necessary for achieving the target position and, after active user confirmation, indirectly or directly activates the specific crane actuators for the performance of the crane movements determined by means of the crane control.

18 Claims, 3 Drawing Sheets

PROCESS FOR THE ASSISTED PERFORMANCE OF CRANE MOVEMENTS BY A CRANE, AS WELL AS A CRANE

BACKGROUND OF THE INVENTION

The invention relates to a process for the assisted performance of crane movements by a crane with at least two boom elements that are movable relative to one another.

Cranes with boom systems are known from the state of the art. Upon the installation of corresponding cranes, the boom elements of the boom system are moved from one installation condition to a finished mounted condition. The installation condition can thereby be a condition in which the boom system is essentially extended on a support or a base surface extended, for example. The crane cannot carry out any crane works in this condition. After the complete setting up of the boom system, the crane can begin crane operations.

The setting up of the boom system represents a complex motion sequence. In particular, there is only a very narrow motion corridor here within which the crane can be securely moved. Even slight deviations can lead to tilting or to damage to the crane structure, as the case may be. For this reason, in particular, the setting up of the crane requires experienced operating personnel and a high expenditure of time upon the performance of the necessary crane movements.

This problem does not appear only upon the setting up or mounting of a crane. Additional crane movements that can lead to similar critical situations are also conceivable, so that solutions for the assistance of the crane personnel would be desirable in this case as well.

SUMMARY OF THE INVENTION

The task of the present invention consists of offering an auxiliary system for the crane that allows it to initiate a specific crane position, preferably in exceptional situations.

This task is solved by a process in accordance with the characteristics herein. Advantageous embodiments of the process are the object of the description herein.

In accordance with the invention, a process is proposed for the assisted performance of crane movements by a crane, whereby the crane is equipped with at least two boom elements that are movable relative to one another, such as in the form of a main boom and a luffing jib, for example. The main boom can also be a luffing crane tower with an articulated slender boom. It is likewise conceivable that this involves, in the case of boom elements that are movable relative to one another, a derrick boom as well as a main boom and a luffing jib, if necessary. In this connection, the target position can, therefore, be considered to be a load-side target position, not only of the crane, but even a ballast-side target position.

Furthermore, in accordance with the invention, an auxiliary control module is available which, after activation by the user, determines at least one target position of the boom system. The crane movements necessary for achieving the target position are determined in dependence on the target position and, after release by the user, the specific crane actuators are indirectly manipulated for the performance of the crane movements by the auxiliary control module or are activated directly by means of the crane control.

The auxiliary control module can be a component of the conventional crane control. Alternately, the auxiliary control module can be designed as an external module, which can be connected with the crane control. The auxiliary control module does not absolutely have to be solidly installed on the crane but can also be operated as a separate component, such as in the form of a remote control separate from the crane, for example, whereby a suitable communications interface with the crane control is necessary in this case.

It is essential for the invention that the desired target position is determined in advance by the auxiliary control module. The auxiliary module determines the crane movements necessary for achieving the target position in dependence on this. In particular, the auxiliary control module can divide the necessary crane movements into corresponding control commands for the specific crane actuators, so that these can be appropriately activated by the auxiliary control module. After the determination of the necessary crane movements, an active release can yet again be directed by the crane operator. This release can be carried out by means of tactile and/or optical sensors, for example. The crane operator must consequently initially assess the current operating condition by means of an active transfer of the control to the auxiliary control module and, finally, issue an active release for the semi-autonomous control.

It is conceivable that, during the performance of the crane movements, a monitoring of the crane movements performed by the crane control will occur simultaneously. If the crane is located in the regular work area, then the usual load torque limitation can be applied. The current position or the current condition of the crane, respectively, particularly of the boom system, is hereby determined by means of the usual crane sensors and the adherence to the corresponding bearing load table is monitored. This is applicable to crane movements both with and without loads.

It is advantageous if the crane sensor has one or more angle sensors for the detection of the angular position of the individual boom elements. One or more force measuring devices and/or length sensors and/or limit switches or any other possible optical detection systems, respectively, are likewise advantageous. The use of angle sensors makes an angle-based monitoring of the crane possible. In this case, for example, the measured values of the above-stated angle sensor or of other sensors can be checked directly against the corresponding boundary values for monitoring and adherence. A cumbersome conversion into a maximum working radius for the monitoring of a bearing load table is not necessary. The angle-based process has the advantage that even negative angles can be monitored upon the setting up of a boom in the control, since an LMD [load moment device] is not active in these situations.

The word "monitoring" should not be understood as simply the monitoring of the autonomous crane movements performed, but also the actual active regulation of the crane actuators. In the determination of the crane movements, the auxiliary control module should preferably consider any monitoring process or boundary values or tables, in order to avoid critical situations in advance upon the carrying out of the movements.

The determination of the target position can occur in different ways. The simplest possibility consists of the direct inputting of a desired target position by the user. The crane operator can thus, through the setting of a theoretical angle of rotation of the boom and/or of a theoretical working radius or the inputting of geographical coordinate entries, respectively, indirectly input the target position desired into the auxiliary control module, particularly through the setting of longitude and latitude.

It can be alternately provided that the inputting of a target position by the crane operator occurs through the selection of a predefined target position. The crane operator can thereby refer to an integrated databank for possible target positions, for example. Predefined target positions can be contingent on previous history, that is to say, crane positions, such as the crane position for load acceptance or load discharge, are regularly set in the databank either manually or automatically.

It is also conceivable for the crane operator to input no target position, but to only select a specific crane function, whereupon the auxiliary control module automatically determines the specific target position. The autonomous start-up of a situation-dependent shut-off position of the crane could be one possible supported crane function. The scaffold-dependent autonomous setting up or dismounting of the crane boom system could be an additional crane function. An autonomous start-up of a specific installation position, preferably for the assembly or the dismantling of a load block on the boom system, respectively, is likewise conceivable.

After the selection of the corresponding crane functions, the auxiliary control module independently determines at least one target position that is optimal for the performance of the crane function, which is autonomously started up after subsequent release by the user.

Upon the selection of the function for the autonomous start-up of a shut-off position, the auxiliary control module can initially download current and/or future weather data and determine an optimal shut-off position for the crane on the basis of the same. The downloading of this weather data by an integrated crane sensor or by an internal or external databank, respectively, is conceivable. For example, the auxiliary control module can download weather data from any desired external information server by way of a communications interface. The determination of the optimal target position can either be computed by means of the weather data or determined by downloading from an available databank through comparison of weather data. The optimal parking position varies depending on the wind direction, wind intensity, etc., and should thus be newly determined depending on the current situation. Ideally, the weather data is also checked for changes during the shut-off position of the crane. Extreme weather conditions, for example, may then make a change of the parking position necessary or require the dismounting of the boom system, respectively.

Upon the selection of the function for the autonomous set-up or dismounting of the boom system, respectively, a parameter- and/or information query can initially be carried out by the auxiliary control module. The computation of the sequence of the set-up or disassembly process can subsequently be performed on the basis of the parameters or information downloaded. Possible parameters can contain information for the boom configuration prepared. It is additionally queried whether optional auxiliary means are available for the set-up process, such as a trolley cart for supporting the tip of the boom, for example. This can be determined automatically by means of a camera on the crane, for example.

Information concerning the carrying capacity of the supporting ground can likewise be considered.

One or more of the above-stated parameters can be included in the computation of the motion sequence, whereby one or more target positions are determined for the motion sequence that must be carried out for the achievement of the operational crane condition. The sequence of activation of the primary and jib boom, the angular positions, and the changes in the specific angle, must be determined individually.

It is additionally conceivable that the user can, before performing the autonomous set-up or disassembly process, issue specifications or preferences, in regard to the process that are taken into consideration for the determination of one or more target positions of the auxiliary control module. The user can, for example, activate the corresponding preferences for the quantity of ballast used and/or the point in time of the raising of a luffing jib from the support surface or a setting up with extended boom.

The determination of the movements of the crane by the auxiliary control module for achieving any chosen target position can essentially be optimized depending on any possible user specifications. This may considered in the performance of the above-stated crane functions, but also upon the direct inputting of a corresponding target position, as the case may be. Some possible specifications may be the permitting of the optimization of the determined crane movements in regard to the length of the crane movement and/or the load of the crane structure appearing during the crane movement and/or in regard to a ballast-economical movement and/or a minimization of the acceleration processes appearing, for example.

It is preferably provided that the crane movement that is required for achieving the target position is divided into control commands on the crane rotary mechanism and on the drive units for the tilting up and down of the boom system, respectively. The crane movement that is required for achieving the target position is divided into control commands on the crane rotary mechanism and on the drive units for the tilting up and down of the boom system, respectively. The auxiliary control module accordingly makes possible a simultaneous or sequential activation of several actuators for achieving the target position. In addition to the above-stated drives, the control can be expanded by additional drives, as needed.

In addition to the process in accordance with the invention, the present invention likewise relates to an auxiliary control module for a crane with means for the performance of the process in accordance with the invention. The same advantages and characteristics for the auxiliary control module as were presented in the preceding by means of the process in accordance with the invention thus result. A redundant description is accordingly dispensed with for this reason.

Finally, the present invention likewise relates to a crane, particularly a mobile crane, with a crane control and at least one auxiliary control module in accordance with the present invention.

BRIEF DESCRIPTION OF THE DRAWINGS

Additional advantages and characteristics of the invention will be explained in further detail in the following by means of an embodiment depicted in the figures. These depict the following.

DESCRIPTION OF THE PREFERRED EMBODIMENTS

Figure 1:
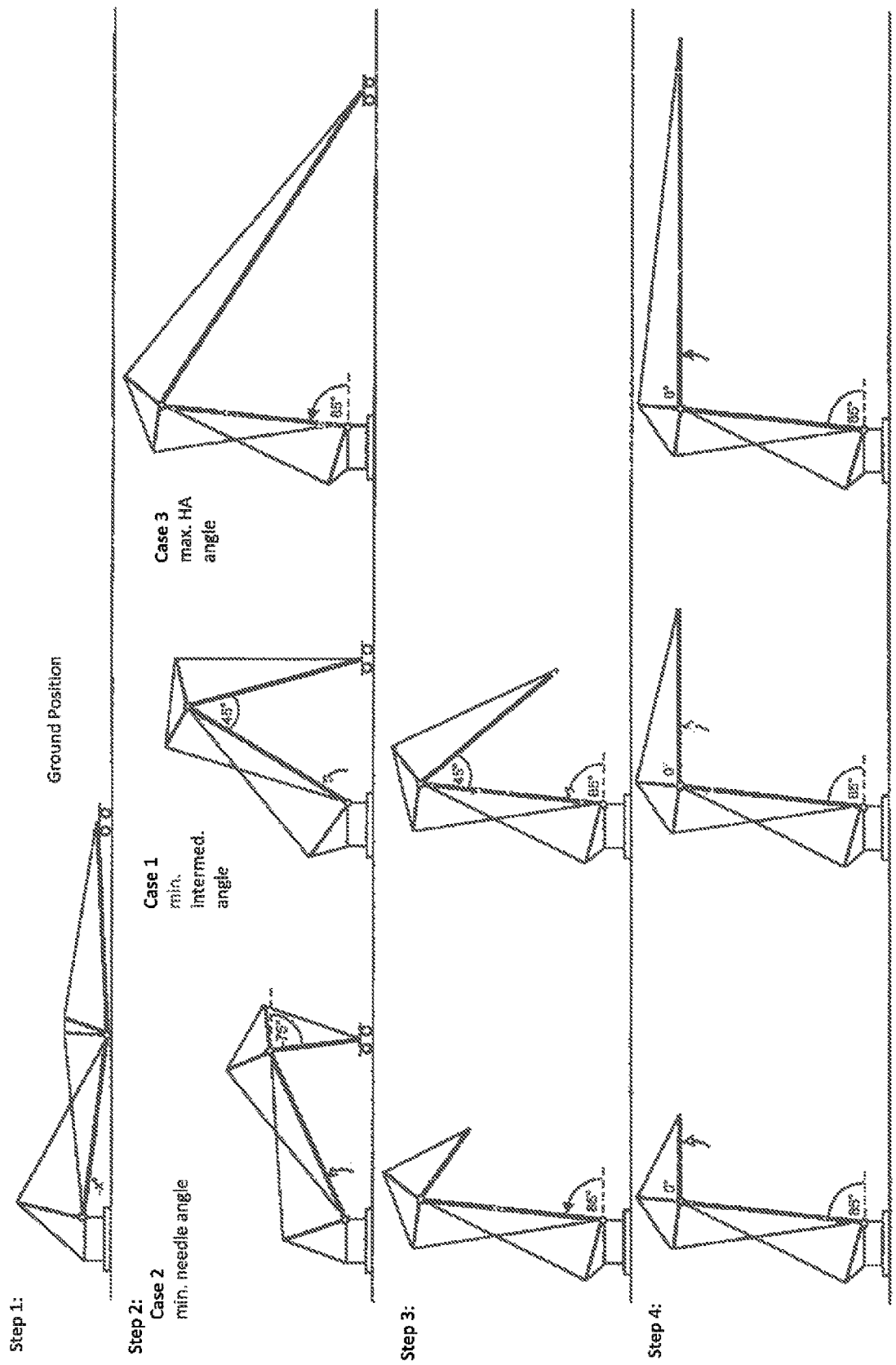
FIG. 1: An embodiment of the process in accordance with the invention for the assisted performance of crane movements by a crane.

An embodiment of the process in accordance with the invention for the assisted performance of crane movements by a crane will be explained in the following in accordance with FIG. 1. The crane of the embodiment includes a primary luffing boom and a luffing boom extension coordinated with it, such as a luffing jib, a slender boom, etc., for example. The process in accordance with the invention primarily serves for the automatic setting up of the crane—i.e., the setting up of the boom system—but it can also be advantageously used for other crane actions.

The starting point is a sensor on the crane of the type already available, particularly an angle sensor, by means of which the individual positions of the boom elements can be determined precisely. For example, the angle of the needle, i.e., the angle of the luffing jib relative to the horizontal, can precisely determine an intermediate angle, i.e., the angle between both boom elements, as well as the angle of the main boom, i.e., the angle of the main boom relative to the horizontal. Through this precise detection of the actual boom position, the crane operator can, within the bearing load table, either with or without load but also outside the bearing load table, switch to a semi-autonomous movement of the crane upon the setting up and dismounting of the boom system. The crane is then optimally brought into the desired target position in accordance with specific magnitudes. The crane operator can, in particular, make specifications in accordance with which the autonomous crane movements are performed as gently as possible relative to the crane structure, the crane is moved as in a manner as ballast-economical as possible, the crane movements are performed with as high a speed as possible, a minimization of the necessary set-up time is aimed at, or the acceleration processes upon the activation of the crane elements remain as small as small possible in terms of amounts.

For the performance of the process in accordance with the invention for the autonomous set-up, reference is made primarily to an auxiliary control module that may be either a component of the existing crane control or even integrated into the crane as an external element, or it may be connected with the same by means of an interface. After the activation of the auxiliary control module by the operator, the query of the parameters for the computation of the sequence of the set-up or disassembly process is performed. The parameters can, for example, additionally make information about the boom configuration, such as whether the head of the boom is movably supported by means of a trolley cart or else how high the carrying capacity of the supporting ground is, necessary. The existence of a trolley cart can also be automatically recognized by means of a camera on the crane.

The auxiliary control module determines a possible first target position from the information available and, as the result, additional target positions for the achievement of the definitive target position in which the crane can begin its actual crane operations, if necessary. One example of different target positions can be inferred from the figure in steps 1, 2, 3 and 4 for the achievement of the LMD range of the bearing load table. During step 1, the boom system is located nearly extended into the base position and the boom system is located almost entirely on the ground. The luffing jib is thereby supported by a trolley cart.

For the performance of step 2, there are three different procedures, which depend on the crane scaffold. In accordance with case 1, a luffing jib of medium length is mounted, so that the main boom can be tilted up far enough until a minimal intermediate angle between the main boom and luffing jib is reached.

In case 2, a short luffing jib is prepared, so that the main boom is tilted up far enough that the luffing jib has a minimal needle angle (negative angle) relative to the horizontal. In the case of particularly long luffing jibs (case 3), the main boom is initially set up at a maximum angle of the main boom.

For cases 1 and 2, the subsequent target position consists of the main boom now being tilted up only to the position of the maximum angle of the main boom, through which the luffing jib raises up from the ground. For the achievement of step 4, the luffing jib is correspondingly adjusted in order to occupy a nearly horizontal position. The angle of the main boom thereby remains unchangeable.

Figure 2:
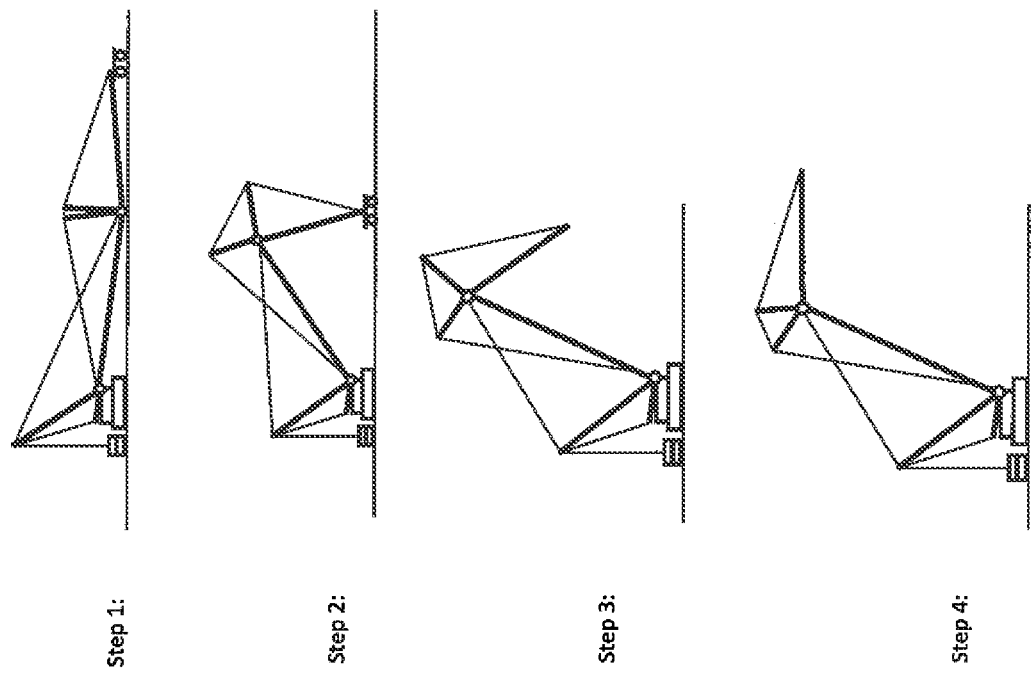
FIG. 2: An embodiment of the process in accordance with the invention for the assisted performance of crane movements by a crane with an additional derrick boom.
Figure 3:
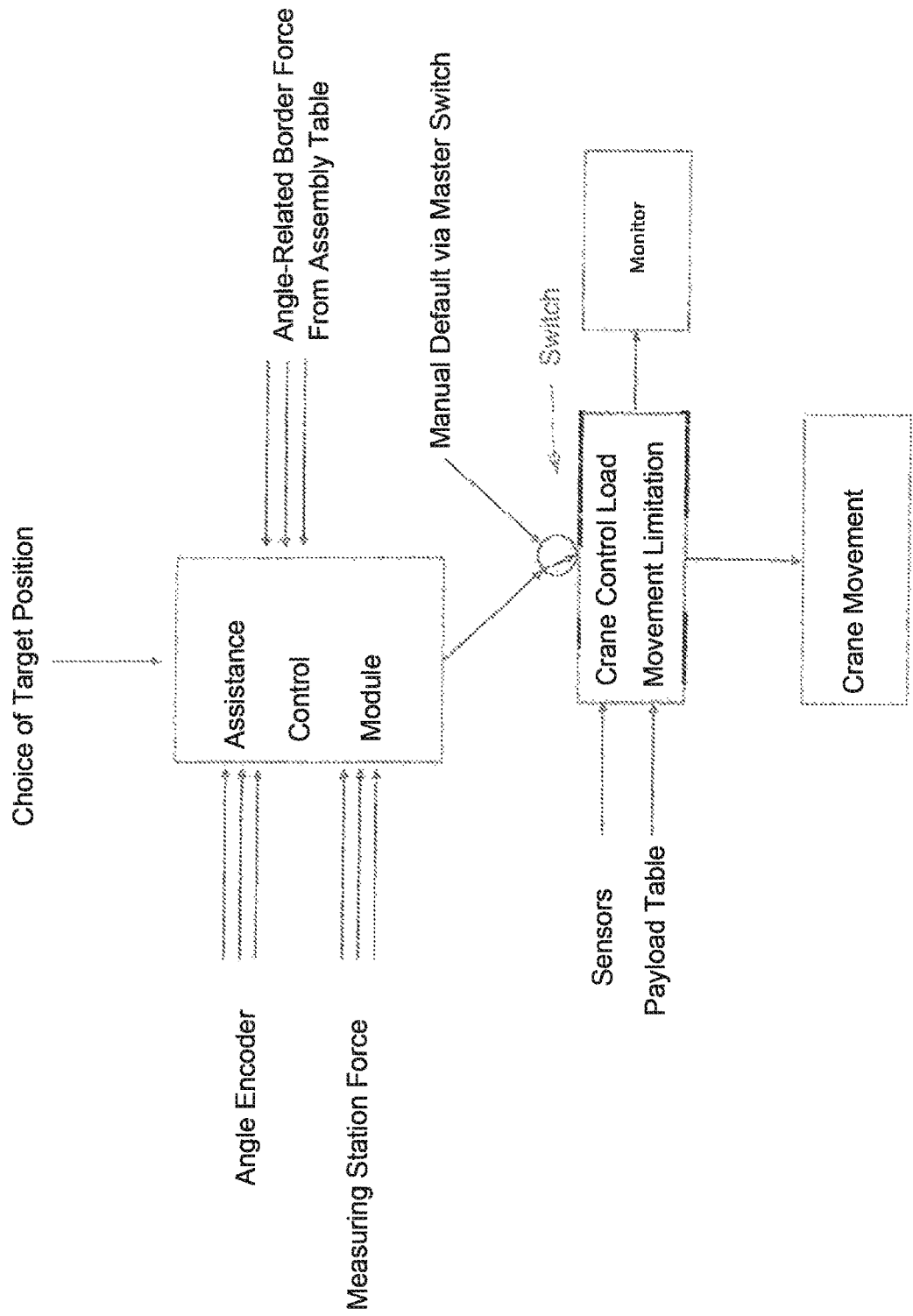
FIG. 3: A block diagram schematically illustrating the control steps of the process in accordance with the invention.

The performance of the process is, however, also possible with the alternative crane scaffold in accordance with FIG. 2. The crane here also includes a main boom and, as in case 1 of FIG. 1, a short luffing jib articulated in a luffing manner. A derrick boom with corresponding derrick ballast is additionally provided. For the performance of the process, the current position of the derrick boom and/or of the derrick ballast must likewise be considered, in addition to the relative positions of the main boom and the luffing jib. The different target positions of steps 1 to 4 essentially correspond to those of steps 1 to 4 of case 1 in FIG. 1.

For the performance of the process in accordance with FIG. 1 and FIG. 2, the individually required crane movements are carried out autonomously by the auxiliary control module and, specifically so, in dependence on the specific set-up configuration—i.e., in dependence on the luffing jib installed on the optional derrick boom, including the derrick ballast, the use of an auxiliary cart for the luffing jib, or the strategy for the set-up process specified by the user. The determination of the individual target positions is determined inside the module, in accordance with the detection of the crane configuration and the user specifications. The target position can hereby be either computed from the following parameters or read off by comparison with the data stored in memory in a databank. Through the active release by a switching element by the auxiliary control module, the movement required for the new position is divided into control commands issued to the rotary mechanism as well as to the drive units for the tilting of the primary and the tip boom up and down or the activation of the derrick boom, respectively. The crane-side monitoring occurs within the context of the data available in the crane, the bearing load tables, or their installation areas, as well as the sensors present in the crane, which may consist of angle sensors, a force measuring device, length sensors, limit switches, and even optical systems. The crane operator must assess the current operating condition and issue a release for the semi-autonomous control through the active transfer of control to the control module. This release can be carried out by means of tactile sensors, as well as by additional optical sensors.

The position identification for the monitoring occurs through the direct measurement of the specific angle. It is particularly preferable, during the setting up of the boom system, that an angle-based monitoring process, in which corresponding boundary values for the measuring angle are present inside the crane control and the crane movements, can be monitored through a direct comparison of the measured values, or interventions can be carried out in a controlling manner.

The process in accordance with the invention offers extensive advantages, particularly upon automatic set-up. During the process of the tilting up of the main mast during the automatic setting up, the table edge of a bearing load table is usually reached, which, as a rule, is not steady, but has "fringes", which point is explained by the iterative determination of bearing load and the interpolation methods.

If the crane approaches the table edge, then a switching-off occurs. As the result of this, it is thereby often very difficult for the crane operator to make the correct decision for the subsequent crane movements. The auxiliary control module can, however, automatically introduce a correction movement in order to solve this problem. During the set-up process, for example, an intermediate angle correction—i.e., a correction of the angle between the main boom and the luffing jib—can thereby occur, so that the boom system has a greater distance from the table edge of a bearing load table and the process can be concluded as securely as possible.

By means of the auxiliary control module in accordance with the invention, a semi-autonomous start-up of boom positions for the parking position of a crane cab can, in addition to the automatic set-up, also move into the out-of-operation mode in order to move the crane, such as into a favorable position for that purpose, for example, for the case of possible higher wind speeds than are specified in the specific bearing load table.

The sensors provided on the crane and their measured values are thereby used for the determination of the optimal position. The determination of the optimal position occurs by means of data computed in advance or else computed for the running time. In addition, current weather data for the positioning or data about expected weather or for the decision about the necessary dismounting of the boom system can be obtained by querying. After the activation of the auxiliary control module by the operator, the querying of the expected wind speed at which the crane should remain in the parking position is carried out. A possible target position is determined from the same by the auxiliary control module. The determination of the target position can occur through a computation on the crane or else from data stored in a databank on the crane. If no target position is possible, then the dismounting of the boom may be necessary.

A distribution of the control commands to the rotary mechanism and the drive units for the tilting of the boom up and down for the achievement of the new position occurs after active release by means of a switching element by the auxiliary control module occurs here, too.

The crane-side monitoring or regulation of the drives may also be carried out here by means of an angle-based process.

As a third variant, a semi-autonomous start-up boom position may be carried out by the auxiliary system inside a bearing load table, both with and without a load. Through the selection of different modes, the auxiliary control module can coordinate and adjust different movements. A superimposed movement for the reduction of the movement times and a reduction of the load on the structure is provided here. The use of position data for the load acceptance or load removal is reasonable.

After the activation of the auxiliary control module by the operator, the query of a target position occurs. The position information can be provided through a statement of the angle of rotation and/or of a working radius and/or through an inputting of geographical coordinates by the user by means of longitude and latitude.

After the active release by means of a switching element, the movement required for the new position is divided into control commands by the control unit on the rotary mechanism and the drive units for the tilting of the boom up and down.

The invention claimed is:

1. A process for assisting movements of a luffing boom and a luffing boom extension of a crane relative to one another, comprising the steps of
   determining at least one target position of the luffing boom, if a user previously selects a supported crane function, particularly an autonomous start-up of a situation-dependent shut-down position and/or a scaffold-dependent autonomous set-up or a dismounting of a crane boom system, and/or an autonomous start-up of an installation position, preferably for assembly/dismantling of a load block,
   determining the crane movements necessary for achieving the target position of the luffing boom, and
   after active user confirmation, activating specific crane actuators for performance of the crane movements determined indirectly or directly by a crane control, to move both the luffing boom and the luffing boom extension with respect to one another.

2. A process in accordance with claim 1, comprising the steps of monitoring and/or regulating the crane movements, by
   determining current position or condition of the crane, particularly of the boom, by one or more angle sensor and/or force measuring devices and/or length sensor and/or limit switches and/or optical systems, and
   checking for observance of boundary values for the measured values and/or of a bearing load table and/or of permissible installation areas.

3. A process in accordance with claim 1, comprising the step of
   determining target position through direct inputting of a target position by a user, such as through a statement of a theoretical angle of rotation and/or of a theoretical working radius and/or through geographical inputting of coordinates, particularly by longitude and latitude.

4. A process in accordance with claim 3, comprising the step of
   inputting of a target position through selection of a predefined target position, whereby the predefined target position is a crane position previously started up manually, particularly a started-up position for load removal and/or load acceptance.

5. A process in accordance with claim 1, comprising the step of
   upon selection of the function of autonomous start-up of a shut-down position, determining current and/or future weather data and, in particular, a wind speed and/or wind direction to be expected and preferably computing the target position on the basis of an optimal shut-down position and/or determining the same through a query to an internal or external databank.

6. A process in accordance with claim 5, comprising the step of determining the weather data by a crane sensor or downloading the weather data from an external information server.

7. A process in accordance with claim 5, comprising the steps of examining the weather data for changes in the shut-down position and determining a new target position or shut-down position, and started up, if necessary.

8. A process in accordance with claim 1, comprising the steps of upon the selection of the function of autonomous set-up or dismounting, querying parameters and/or information for computing the sequence of a set-up or dismounting process and, in particular, recording parameters relating to the current boom configuration and/or the use of any possible auxiliary devices, such as trolley cart for the support of the tip of the boom, and determining information concerning the carrying capacity of the supporting ground.

9. A process in accordance with claim 8, comprising the steps of on the basis of the parameter and/or information query, determining at least one possible target position for the setting up or dismounting of the boom system, and, preferably initially determining a first target position and, as a result, additional target positions for the achievement of the definitive target position.

10. A process in accordance with claim 8, comprising the step of considering additional user specifications relating to performance of the set-up or disassembly process for determination of one or more target positions, particularly those relating to the quantity of ballast used and/or on point in time of raising the luffing jib from the support surface and/or setting up the boom extension.

11. A process in accordance with claim 1, comprising the step of optimizing the determination of the crane movements for achieving the target position in dependence on a user specification and, in particular, a specification relating to the optimization of the length of the crane movement and/or the load of the crane structure appearing during the crane movement and/or a ballast-economical movement and/or a minimization of the acceleration processes appearing.

12. A process in accordance with claim 1, comprising the step of dividing the crane movements required for achieving the target position into control commands on the crane rotary mechanism and on the drive units for the tilting up and down of the boom system, respectively.

13. An auxiliary control module for a crane with means for the performance of the process in accordance with claim 1.

14. A crane, particularly a mobile crane, with a crane control and at least one auxiliary control module for the performance of the process in accordance with claim 1.

15. A process for assisting movements of a luffing boom and a luffing boom extension of a crane relative to one another, comprising the steps of arranging the luffing boom and the luffing boom extension to be essentially horizontally extended along the ground, determining at least one target Position of the luffing boom, determining the crane movements necessary for achieving the target position of the luffing boom, after active user confirmation, activating specific crane actuators for performance of the crane movements determined indirectly or directly by a crane control, to move both the luffing boom and the luffing boom extension with respect to one another, upwardly tilting the luffing boom to form an acute angle between the luffing boom and the luffing boom extension such that a tip of the luffing boom extension remote from the luffing boom remains on the ground, raising the tip of the luffing boom extension off the ground, and adjusting the luffing boom extension to occupy a substantially horizontal position or orientation.

16. The process in accordance with claim 15, comprising the additional step of adjusting position of a derrick boom depending upon position or orientation of the luffing boom and the luffing boom extension with respect to one another.

17. The process in accordance with claim 1, wherein said steps are accomplished by an auxiliary control module which forms part of a crane control or is an external module connected with the crane control and remotely positioned from the crane.

18. The process in accordance with claim 1, wherein said steps are carried out by sensors positioned upon the crane at discrete locations for monitoring position and movement of the luffing boom and the luffing boom extension.

* * * * *